United States Patent [19]

Durum

[11] Patent Number: 4,795,012

[45] Date of Patent: Jan. 3, 1989

[54] SPIRAL SPRING DISC TORSIONAL COUPLING

[75] Inventor: Metin M. Durum, Elmhurst, Ill.

[73] Assignee: Borg-Warner Automotive, Inc., Troy, Mich.

[21] Appl. No.: 53,940

[22] Filed: May 26, 1987

[51] Int. Cl.[4] ................................................ F16D 3/79
[52] U.S. Cl. ................................ 192/55; 192/106.1; 464/99
[58] Field of Search .................. 192/55, 70.17, 106.1; 464/58, 59, 98, 99; 74/449

[56] References Cited

U.S. PATENT DOCUMENTS

| | | | |
|---|---|---|---|
| 1,127,154 | 2/1915 | Andersen et al. | 464/58 X |
| 1,645,510 | 10/1927 | Wood | 64/27 |
| 1,975,772 | 10/1934 | Davis | 192/106.1 |
| 1,997,021 | 4/1935 | Spase | 64/27 |
| 2,141,014 | 12/1938 | Nutt | 192/68 |
| 2,407,757 | 9/1946 | MacCallum | 464/98 X |
| 3,301,356 | 1/1967 | Pompa | 188/218 |
| 3,304,924 | 2/1967 | Dolza | 123/90 |
| 3,387,505 | 6/1968 | Rumsey | 74/574 |
| 3,759,066 | 9/1973 | Portnoy | 64/27 S |
| 4,044,628 | 8/1977 | Jacks | 464/98 X |
| 4,145,936 | 3/1979 | Vincent et al. | 74/574 |
| 4,148,385 | 4/1979 | Sink | 192/106.1 |
| 4,181,208 | 1/1980 | Davis | 192/106.1 |
| 4,480,736 | 11/1984 | Loizeau | 192/106.1 |
| 4,496,036 | 1/1985 | Loizeau | 192/106.2 |
| 4,608,883 | 9/1986 | Bopp | 464/58 X |
| 4,630,498 | 12/1986 | Santi | 74/449 |
| 4,662,239 | 5/1987 | Wörner et al. | 74/574 |

FOREIGN PATENT DOCUMENTS 1953196 4/1970 Fed. Rep. of Germany ........ 464/58

Primary Examiner—Allan D. Herrmann
Attorney, Agent, or Firm—James A. Geppert

[57] ABSTRACT

A torsional coupling or resilient damper assembly for a friction clutch or torque converter lock-up clutch which is formed of a plurality of spiral spring plates or discs that are secured together as a unit with an outer peripheral ring and an inner ring for each disc joined together by one or more spiral spring members formed by one or more spiral slots extending between the inner and outer rings. The coupling is formed of a stack of plates wherein the slots in the plates are axially aligned and the forces in the plates are balanced when two or more spiral slots are utilized. If a single spiral slot is provided in each disc, the forces are balanced by alternate plates being reversed or all plates being positioned identically but phased through angles divisible into 360°. Different embodiments of spiral spring discs may be combined in a single assembly.

23 Claims, 9 Drawing Sheets

U.S. Patent   Jan. 3, 1989   Sheet 1 of 9   4,795,012
Fig. 1
Fig. 10
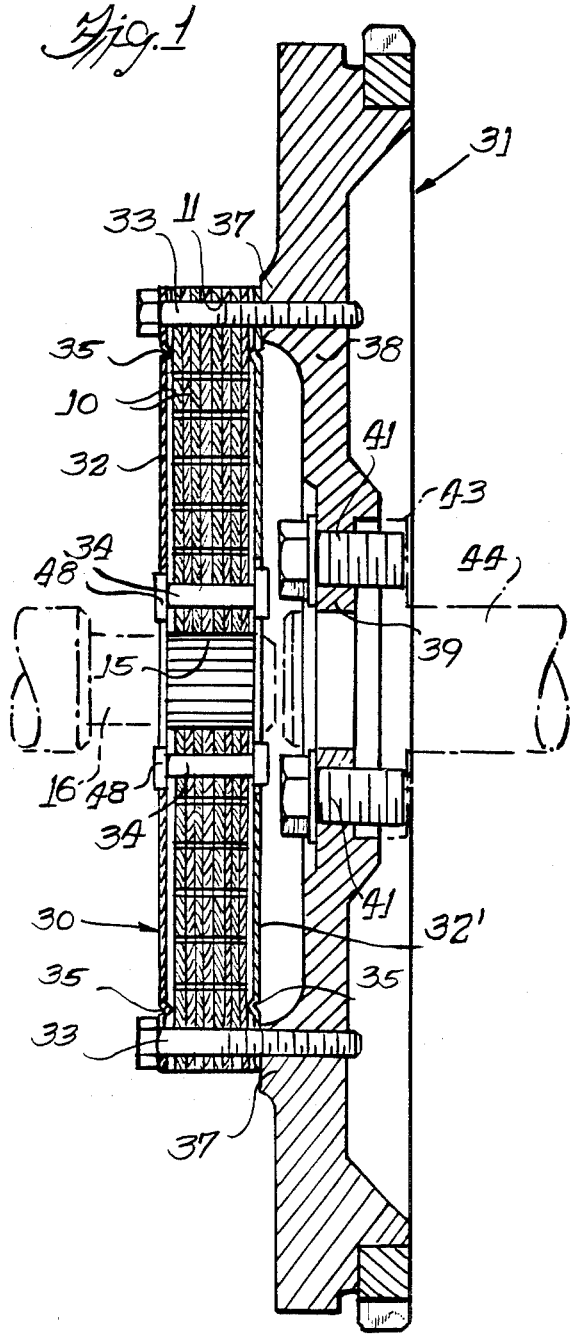
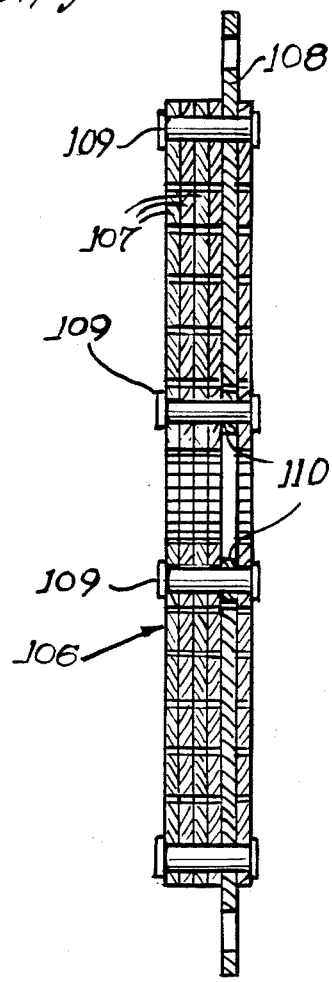

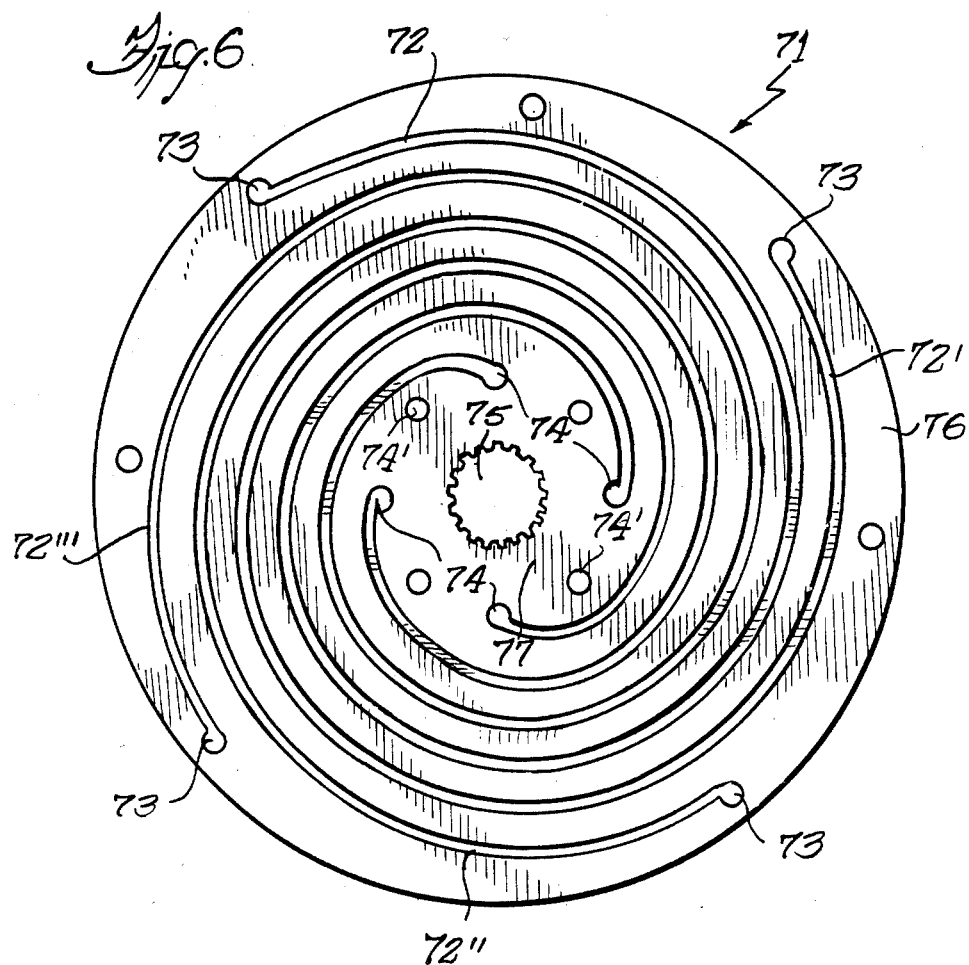

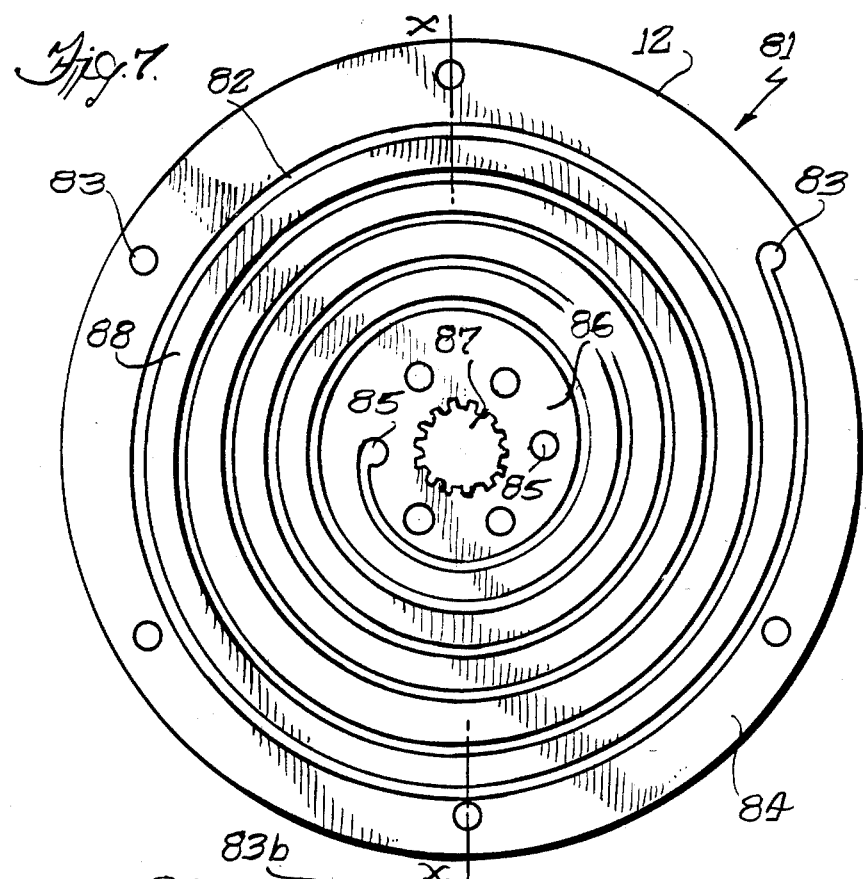
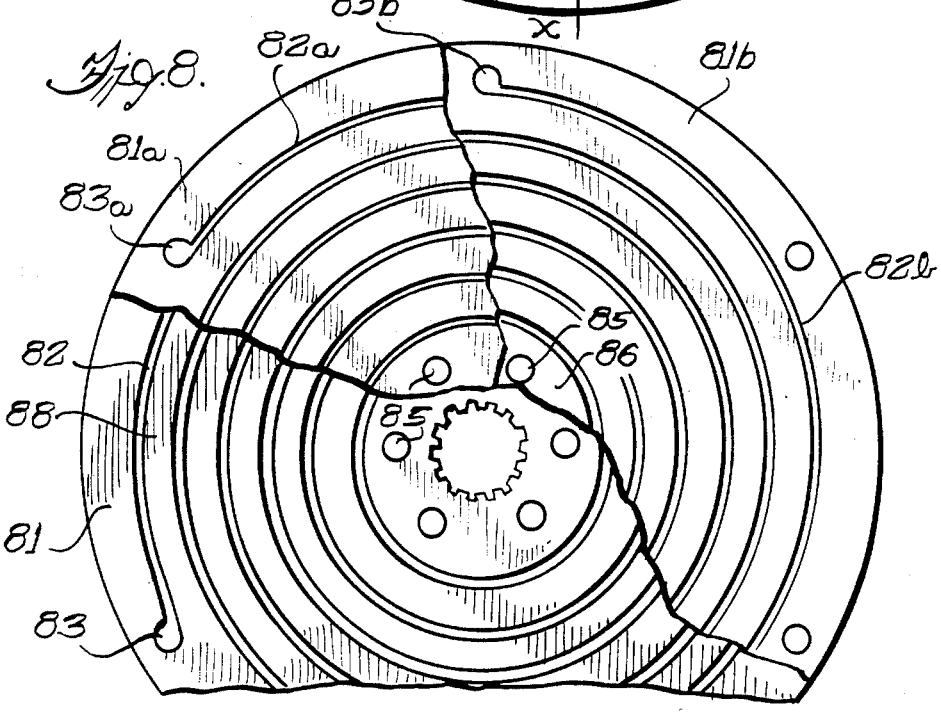

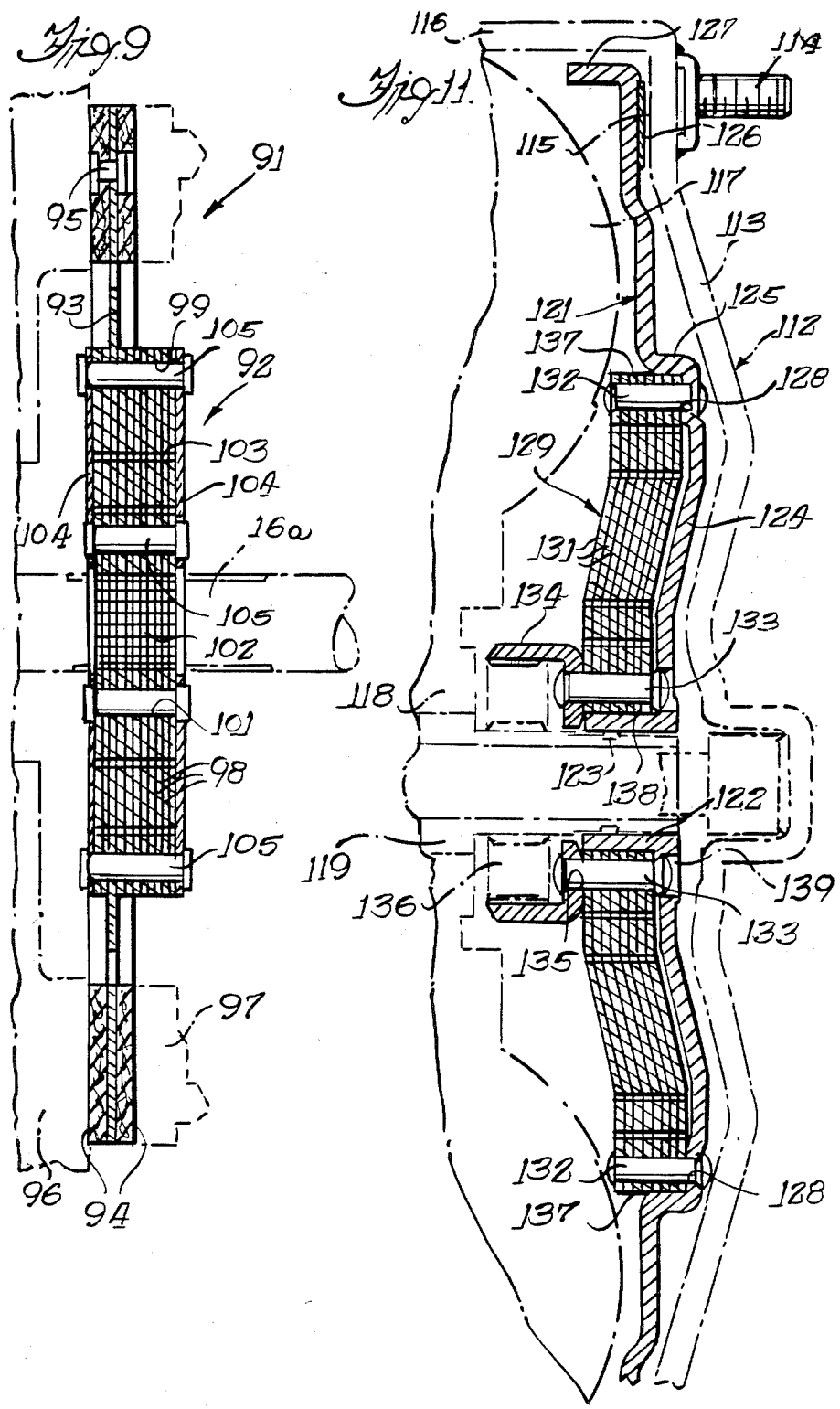

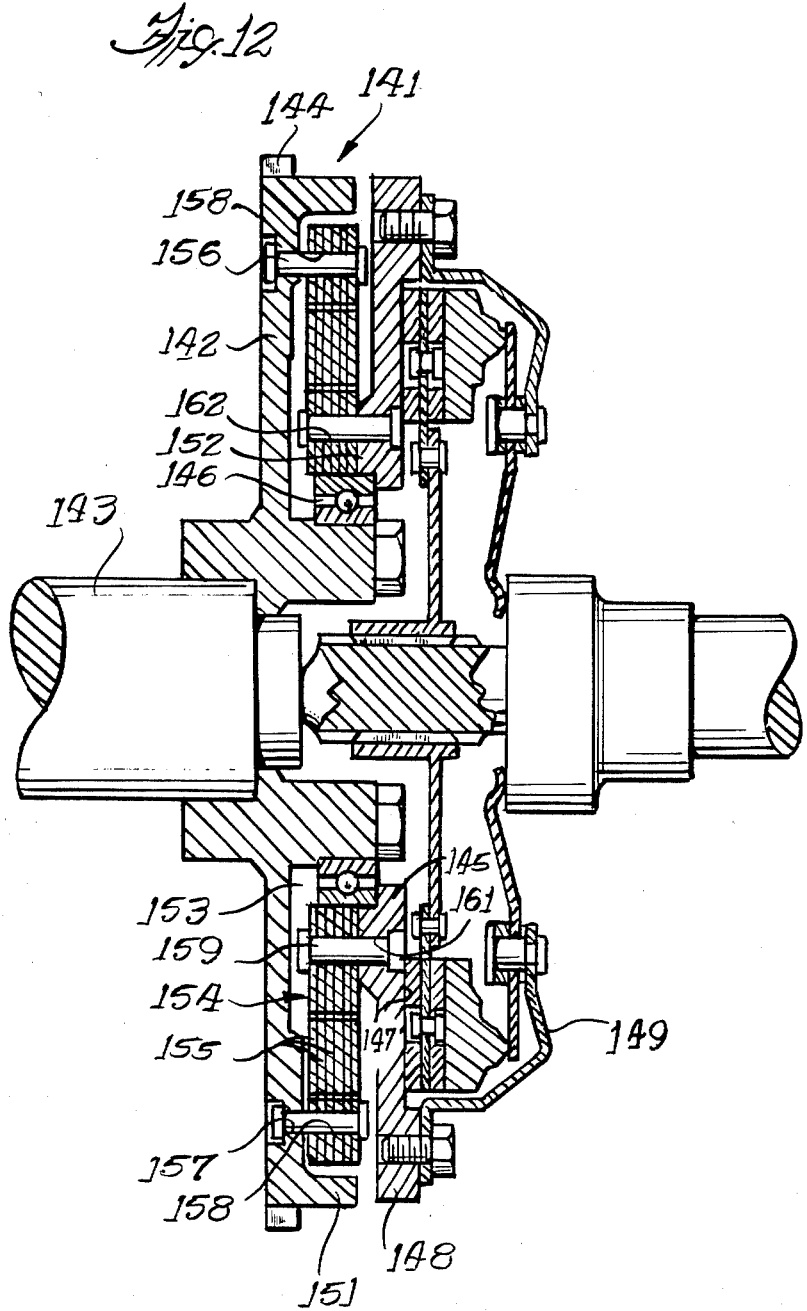

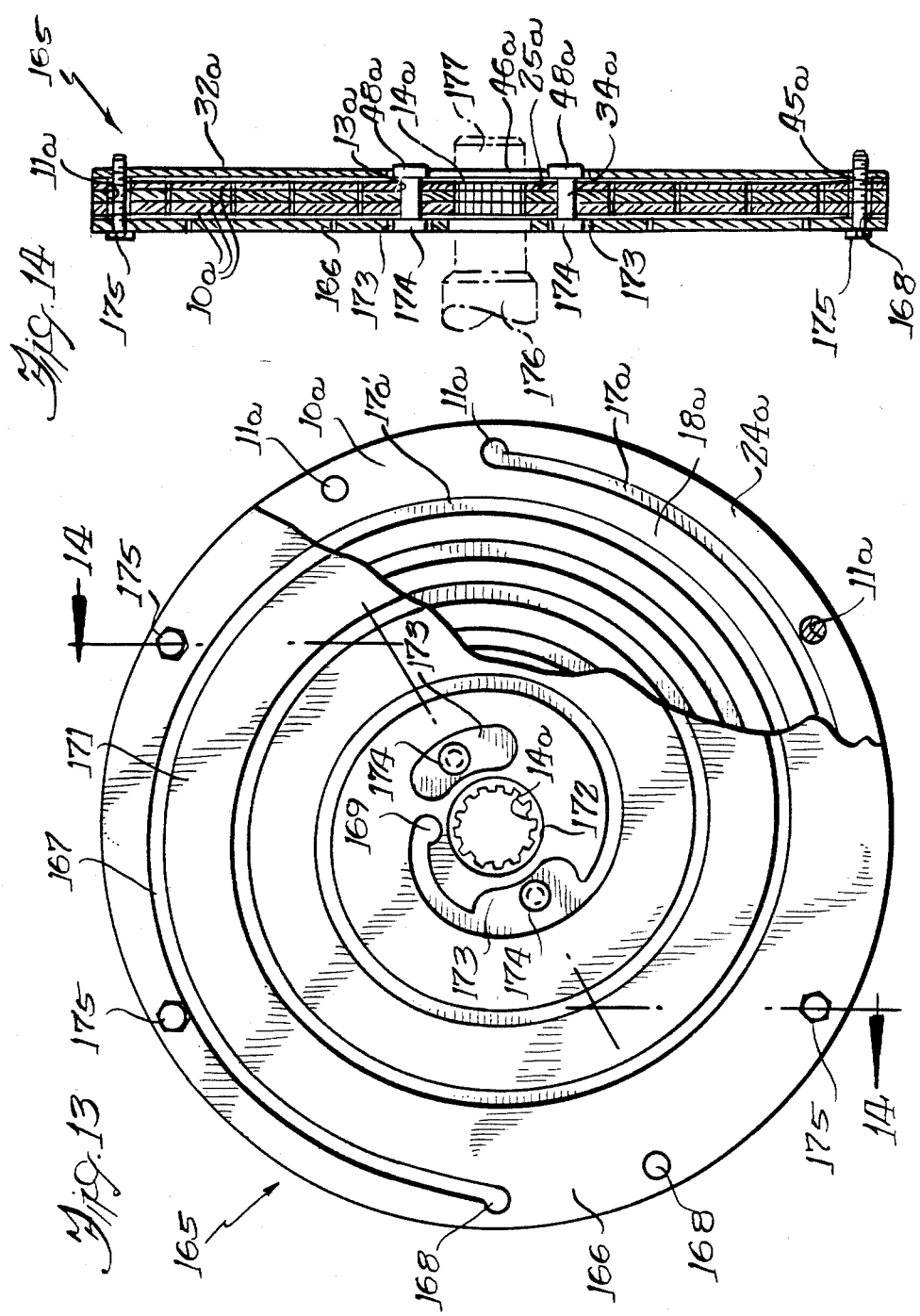

SPIRAL SPRING DISC TORSIONAL COUPLING

BACKGROUND OF THE INVENTION

The present invention relates to a resilient torsional coupling or damper structure formed of a plurality of spiral spring plates or discs.

A torsional coupling is generally interposed between a driving shaft or torque input member and coaxial driven shaft or torque output member. This type of device is to permit regulated transmission of rotational torque between the members while filtering out vibrations which may occur in the system, such as in a driveline between a vehicle engine and the transmission acting to drive the wheels of the vehicle.

A conventional torsional coupling or damper generally comprises circumferentially acting resilient means, such as helical springs, which are positioned in axially aligned spring windows formed in two or more plates capable of relative rotation therebetween. When torque is applied to the driving plates, the springs are compressed to resiliently urge rotation of the driven plate. A helical spring damper is conventionally used in a vehicle friction clutch or a lock-up clutch within a torque converter housing to dampen the impulses of the vehicle engine which would otherwise cause undesirable characteristics; e.g., impact loadss, pulsations, noises, etc. in the driveline and/or transmission of the vehicle.

A major problem in present damper designs is the amount of space necessary for the damper structure because of the number of helical springs and their circumference utilized in the structure. Also, these dampers require a substantial number of plates, hub and hub arms and torque input members, as well as the helical springs used singly or in nests of two or three concentric springs. Further, such dampers are costly, and under heavy vibrations, their fit-in parts rattle.

Spiral springs have been utilized for torsional long travel applications such as clocks, small engine starters, toys, etc. They have also been tried for heavy loads such as for automotive clutches, however, difficulties have been experienced in fatigued connections and uncontrollable friction between the layers. The present invention overcomes the complexity and difficulties of prior spring damper structures by using a minimum number of substantially identical compact spiral spring parts to provide the damping action.

SUMMARY OF THE INVENTION

The present invention relates to a torsional coupling or damper structure formed of a plurality of spiral spring plates or discs which are secured together in a stack with end plates by bolts or rivets; each spring plate comprising an outer peripheral ring and an inner ring or hub connected by one or more spiral spring arms or members. The springs are manufactured out of thin plates having one or more spiral slots stamped or otherwise formed therein, and a plurality of the plates are stacked together with outer end plates and bolted or riveted together for the required load capacity. Where $N_G$ is the number of turns of a groove or slot and $N_L$ is the number of spiral slots or spring arms, then $$N_S = N_G - \frac{1}{N_L}$$

where $N_S$ is the number of spiral turns of a spring arm in the spiral spring disc; thus a spiral spring disc can be designed for a specified maximum travel with an allowable stress level. The end plates and/or supporting members also provide for self centering, overload protection, guiding and clamping for damping.

The present invention also relates to a spring disc assembly formed of a stack of identical spiral spring discs or plates wherein the plates are symmetrical and self balanced. Each plate has two or more spiral slots forming a corresponding number of spiral spring arms. As the plates have multi-lead spirals, no phasing is necessary to overcome radial forces during wind-up of the springs and concentricity of the plates is maintained. Any number of discs, even in different configurations, can be packed together without any rotating radial forces on the shafts.

The present invention further relates to a spiral spring disc assembly wherein the formed discs or plates in the stack forming the damper balance the loads and work as a single flexible unit with no internal backlash and rattle.

The present invention also relates to a spiral spring disc coupling or damper wherein two or more spiral slots formed in each plate define the spiral spring members acting between the inner and outer rings. The spring arms have substantially constant widths throughout except for the ends intersecting openings in the inner and outer rings.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a vertical cross sectional view of a spiral spring disc assembly showing its use in a torsional coupling.

FIG. 6 is an elevational view of a third embodiment of spiral spring disc.

FIG. 7 is an elevational view of a fourth embodiment of spiral spring disc.

FIG. 8 is an elevational view, partially broken away, of three spiral spring discs, such as shown in FIG. 7, phased by 60° angles.

FIG. 9 is a vertical cross sectional view of a spring disc coupling or damper utilized in a friction clutch assembly.

FIG. 10 is a vertical cross section of an alternate embodiment of spiral spring coupling.

FIG. 11 is a cross sectional view of the damper assembly having out-of-plane formed spiral discs for a torque converter lock-up clutch.

FIG. 12 is a cross sectional view of a split flywheel having a spiral spring disc assembly between the two portions of the flywheel.

FIG. 13 is an elevational view, with portions broken away, of a multi-stage spring disc assembly.

FIG. 14 is a cross sectional view taken on the irregular line 14—14 of FIG. 13.

DESCRIPTION OF THE PREFERRED EMBODIMENTS

Figure 2:
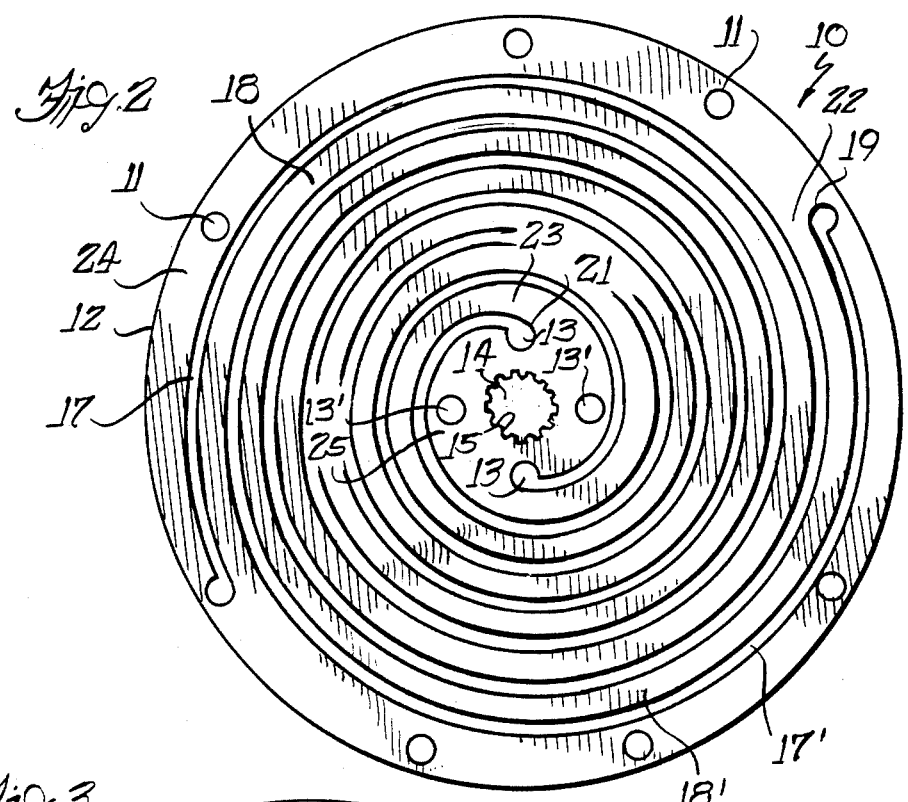
FIG. 2 is an elevational view of one embodiment of a spiral spring plate or disc for the assembly.

Referring more particularly to the disclosure in the drawings wherein are shown illustrative embodiments of the present invention, FIG. 2 discloses a preferred form of spiral spring plate or disc 10 for use in the various assemblies of the present invention. This plate or disc 10 is formed from a flat thin metal plate having a plurality of outer openings 11 formed adjacent the outer periphery 12 and a plurality of inner openings 13,13' adjacent a central opening 14 in the plate which may be splined as at 15 to receive the splined end of a shaft 16.

Two spiral slots or grooves 17,17' are stamped, cut, machined or otherwise formed through the plate to generate the spiral spring members or beams 18,18', each slot intersecting one of the outer openings 11 tangentially as at 19 and intersecting one of the inner openings 13 tangentially at 21; the slots intersecting the outer and inner openings at 180° arcuate intervals. To minimize any curvature effect, smooth curves such as achimedes or involute-spirals are utilized for the groove or slot center line. To maintain the maximum stress level uniformly, the spring sections can gradually be increased as at 22 and 23 in the neighborhood of outer and inner rings 24 and 25, respectively, with each groove merging into the openings 11 and 13.

As seen in FIG. 1, the spring plates 10 are incorporated in an assembly 30 for a torsional coupling 31 wherein a plurality of plates 10 are packed in parallel between opposite end plates 32,32' and retained by suitable securing means 33 and 34, such as rivets or bolts, projecting through the aligned sets of outer and inner openings 11 and 13', respectively. The rivets 34 project through the inner openings 13' between the openings 13 intersecting the grooves or slots 17,17', whereas the bolts 33 project through at least some of the openings 11 into an annular ridge or individual bosses 37 of a flywheel 38 having an inner flange 39 receiving bolts 41 to secure the flywheel to a flange 43 of the engine drive shaft 44.

As the spring plates 10 are symmetrical, the forces in the damper are balanced with each of the spring plates having the slots or grooves 17 and 17' axially aligned. Each end plate 32 or 32' (see FIG. 3) has a plurality of openings 45 adjacent its periphery receiving the bolts 33 and a generally hourglass-shaped central opening 46 providing enlarged arcuate recesses 47,47 receiving the heads 48 of the rivets 34 and a necked down portion generally axially aligned with the central openings 14 in the discs 10 defined by a pair of oppositely disposed, inwardly extending arms 49. The arcuate portions 47,47 act to limit the rotation of the outer ring 24 relative to the inner ring 25 by limiting the movement of the rivet heads 48 in the recesses 47. Also, the end plates may have dimples 35, or shims (not shown) may be positioned between the end plate and adjacent spring discs, to provide a slight spacing therebetween.

When torque is applied to either the outer or inner ring, the rings rotate relative to each other as permitted by the spiral spring beams. During winding or unwinding (angular displacement, travel, etc.), a point on a spring beam 18 or 18' moves tangentially and radially as a function of location and travel. No relative motion is expected between identical spring discs assembled in phase and in parallel since they travel together as a single disc. However, very small relative motions may be found due to unavoidable manufacturing tolerances and distortions.

Friction damping can be obtained utilizing the relative motion between the adjacent faces of the spring discs, spring disc and adjacent end plate or spring disc and a supporting wall under a load. The needed clamping force can be produced by slightly dished-in end plates. End plates can also be grooved for better load control. Also, friction materials (e.g. paper friction material) can be used on the rubbing faces to prevent wear and fretting. On the other hand, when damping is not necessary, the adjacent discs having relative motion can be separated by shims, material built on the surfaces, dished-in bolt or rivet holes, dents or dimples. Clearance may not be necessary between the discs having no relative motion.

Figure 4:
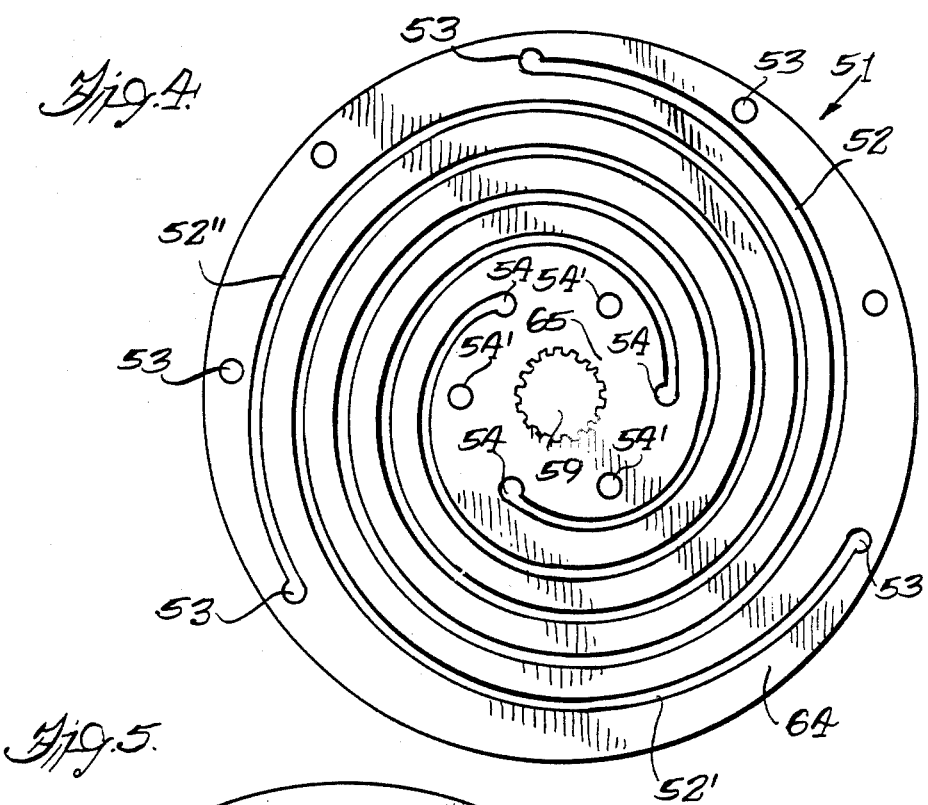
FIG. 4 is is an elevational view of a second embodiment of spiral spring disc.
Figure 5:
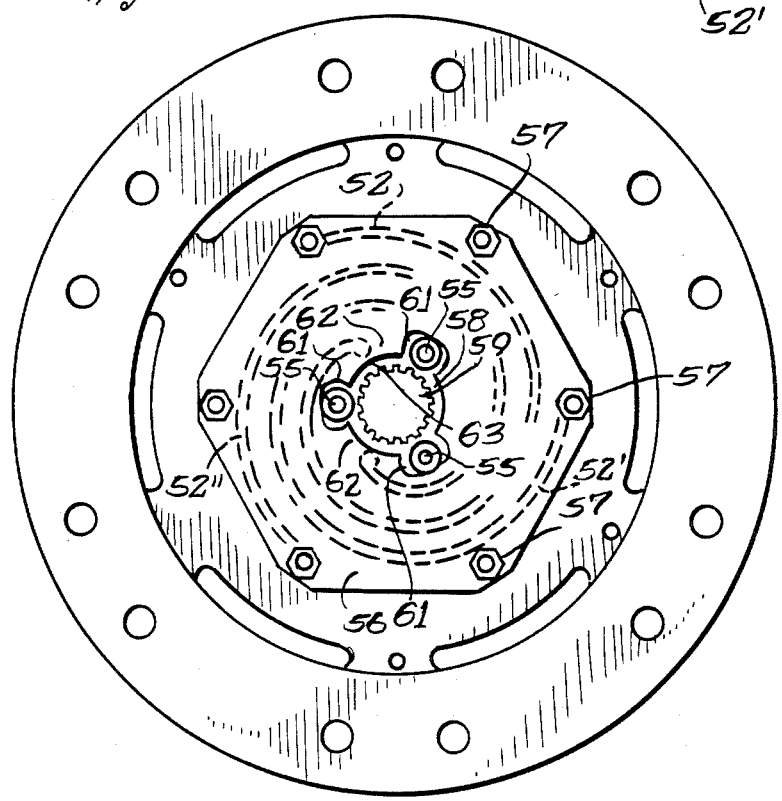
FIG. 5 is a rear elevational view of a clutch damper utilizing the spiral spring disc of FIG. 4.

A second embodiment of spiral spring disc 51 is shown in FIG. 4 wherein the disc is provided with three spiral grooves or slots 52,52',52", each slot beginning at an outer opening 53 and ending at an inner opening 54. As in the embodiment of FIG. 2, each disc includes a plurality of outer openings 53 and inner openings 54,54'; the rivets 55 extending through the openings 54' between the openings 54 at the termination of the slots. As seen in FIG. 5, end plates 56 are complementary to the spiral spring discs 51 in having peripheral openings to receive bolts or rivets 57 extending through the openings 53 of the discs. A central irregular opening 58, axially aligned with the splined openings 59 of the discs, has three arcuate peripheral recesses 61 separated by inwardly extending arm portions 62 having arcuate inner edges 63. Each recess 61 receives the enlarged head of a rivet 55 so that the rivet heads and recesses limit relative rotation between the outer rings 64 and inner rings 65 of the spring discs 51. The outer profile of the opening recesses 61 also provides centering between the outer ring 64 and the inner ring 65 with the rivet heads.

FIG. 6 discloses a third embodiment of spiral spring disc 71 having four spiral grooves or slots 72,72',72",72'" formed therein, each slot extending from one of the plurality of outer openings 73 in the disc to terminate in one of the inner openings 74. Each disc has a central splined opening 75, and the openings initiating the slots are circumferentially equally spaced around the disc periphery.

Figure 3:
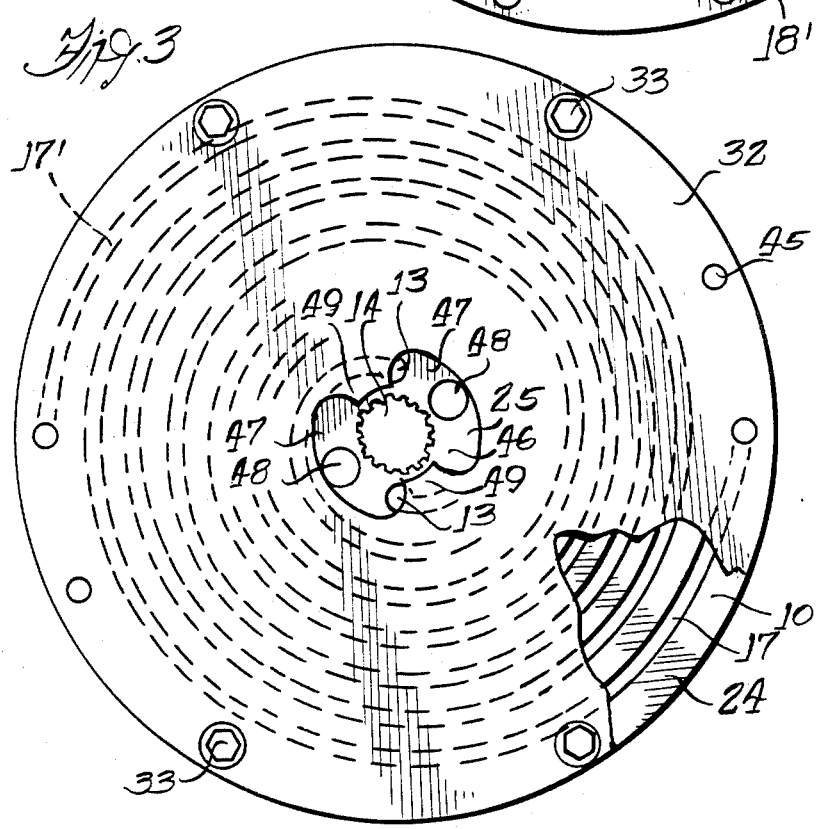
FIG. 3 is an elevational view partially broken away, of a spiral spring disc assembly with an end plate secured thereto.

With reference to FIGS. 3, the end plates (not shown) for the stack of discs 71 would have a central opening with two arcuate peripheral recesses receiving rivet heads identical to the end plate 32 shown in FIG. 3. The rivets would be positioned in only two of the openings 74' not receiving a groove end. As in the previous embodiments, the recesses and rivet heads limit relative rotation between the disc outer ring 76 and inner ring 77. Obviously, the number of spiral slots in the disc may be increased within the limitations of the strength and area of the discs.

A fourth embodiment of spring disc 81 is seen in FIGS. 7 and 8 having a single spiral slot 82. As seen in FIG. 7, the slot 82 begins in an opening 83 in the outer ring 84 of the plate 81 and terminates in an opening 85 in the inner ring 86; the plate having a splined central opening 87. As the plate 81 is not balanced or symmetrical, as are the previous embodiments of plates 10, 51 and 71, balancing the forces in the plates requires a different arrangement of plates from the aligned versions of the previous embodiments. One arrangement is seen in FIG. 8 where the plates are phased by rotating each successive plate through an angle divisible into 360°. In FIG. 8, the first slot 82 is located in the opening 83 of the first plate 81, the next plate 81a will have the slot 82a beginning at opening 83a removed by a 60° angular displacement from opening 83, and the slot 82b in the third plate 81b begins in opening 83b at an an additional 60° angle from opening 83a.

Figure 15:
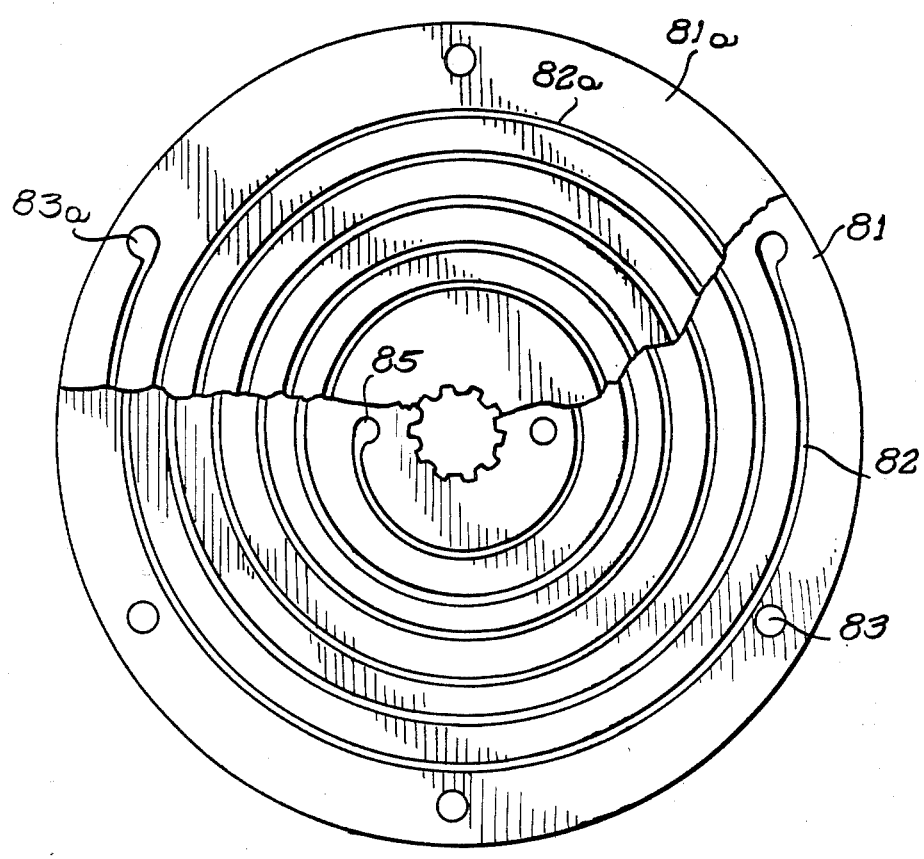
FIG. 15 is an elevational view, with portions broken away, of an alternate damper assembly utilizing the spring disc of FIG. 7.

Likewise, the slots will terminate at different inner openings 85 in the inner ring 86. This phasing of successive spring plates will be necessary for the damper in any application thereof and may be for 90°, 120° or 180° rather than the 60° angle as shown depending on the number of openings 83 and 85. In the alternative, successive plates 81 and 81a in the stack are rotated 180° about the axis X—X of FIG. 7, as seen in FIG. 15, so that the slots 82,82a extend in opposite directions; thus as one set of springs wind up, the reversed spring plates unwind.

FIG. 9 discloses a spring disc assembly 92, similar to assembly 30, utilized for a vehicle friction clutch 91 in the drive line between the vehicle engine and a manual transmission to drive the vehicle wheels. The clutch assembly includes a spiral spring clutch plate 93 having a larger diameter than the remaining spiral spring discs 98 in the stack; friction facings 94 being suitably secured, such as by rivets 95, to the plate 93 at the outer periphery thereof so that the facings will be in contact with a flywheel 96 and a pressure plate 97 of the clutch assembly. Each spring disc 98 and clutch plate 93 is formed with outer openings 99, inner openings 101 adjacent a splined central opening 102, and spiral grooves or slots 103 extending from outer openings 99 to inner openings 101.

End plates 104,104 sandwich the spring discs 98 therebetween, and suitable securing means, such as bolts or rivets 105, extend through the inner and outer openings 101 and 99, respectively, to secure the stack together. The splined central openings 102 in the discs are axially aligned to receive the splined end of a transmission input shaft 16a leading to the vehicle manual transmission.

An alternate embodiment of spring disc assembly 106 for a clutch plate is shown in FIG. 10 wherein spring discs 107, similar to discs 10 or 98, are utilized with a single plate 108, replacing the end plates 32 or 104, extending radially beyond the spring disc pack to be riveted onto the plate or suitable cushion springs carrying the friction facings (not shown). The clutch plate does not have any spiral slots formed therein and terminates short of the inner circle of openings receiving rivets 109 carrying hardened bushings 110 to retain the pack of spring discs together. A central opening, similar to opening 46 or 58, on plate 108 provides centering and limiting rotational travel with the inner rivets 109 and/or the hardened bushings 110 carried by the rivets.

Another environment for the damper assembly of the present application is in a lock-up clutch for a torque converter as seen in FIG. 11. This torque converter assembly includes a torque converter housing 112 having a generally radial wall 113 carrying bolts 114 secured thereto for attachment to the flexplate of a flywheel (not shown) driven by the engine and having an annular friction surface 115 adjacent its outer axial wall 116 which extends over and is operatively connected to an impeller or pump (not shown). A turbine 117 is positioned opposite the impeller and has a hub 118 operatively connected to the transmission input sleeve shaft 119. Also, a stator (not shown) is located between the impeller and turbine as in conventional torque converter design.

A generally annular, axially reciprocable piston plate 121 has an inner flange 122 in sliding engagement with the sleeve shaft 119; the shaft having an annular groove receiving a sealing ring 123 engaging the flange 122. The piston plate curves outward at 124 up to an intermediate shoulder 125 and then extends radially outwardly to an annular friction facing 126 adjacent an outer peripheral flange 127; the facing 126 cooperating with the friction surface 115 in the housing. A plurality of openings 128 are formed adjacent the shoulder 125.

The damper structure 129 is positioned in the space between the inner flange 122 and shoulder 125 of the piston plate 121 and consists of a plurality of spring discs 131 similar to that shown in FIG. 2. The stack is secured to the piston plate by rivets 132 through the outer openings and openings 128, and rivets 133 extend through the inner openings and openings 135 in an annular L-shaped bracket 134 operatively connected to the sleeve shaft 119 through a spacer ring 136 splined to the bracket and shaft; arcuate slots 139 in the plate 121 allowing movement of the discs relative to the piston. Due to the limited space between the turbine 118 and the torque converter housing 112, the spring discs are deformed in an axial direction to generally conform to the curved surface 124 of the piston plate 121. Thus the outer periphery 137 of each spring disc is vertically offset from the inner periphery 138 thereof. Obviously, this damper arrangement operates in the same manner as previous damper designs.

FIG. 12 discloses a further use of the spring disc assembly for a split or two-mass flywheel 141 wherein a first flywheel portion 142 is bolted onto a mounting flange of an engine drive shaft 143 and has a peripheral ring gear 144 for the starter of the engine. A second generally annular flywheel portion 145, rotatably mounted onto the first flywheel through a bearing 146, provides an annular friction surface 147 facing the friction surface of a clutch plate, and has an outer peripheral ridge 148 to which the clutch cover 149 is bolted.

The first flywheel portion 144 is provided with a rearwardly extending outer flange 151, and the second flywheel portion 145 has a forwardly extending inner flange 152 adjacent the bearing 146; the flywheel portions and outer and inner flanges defining a generally annular chamber 153 receiving the spiral spring disc assembly 154. This assembly consists of a plurality of discs 155, such as shown in FIGS. 2, 4 or 6 with bolts or rivets 156 extending through openings 157 in the first portion and the outer openings 158, and bolts or rivets 159 extending through openings 161 in the second portion and the inner openings 162 of the discs. This spring disc arrangement will provide a damper function comparable to a helical spring damper for the split flywheel.

A further embodiment of the spiral spring disc coupling is shown in FIGS. 13 and 14, wherein the assembly 165 includes several plates 10a identical to plates 10 seen in FIG. 2, an end plate 32a, such as seen in FIG. 3, and a single spiral spring disc 166 stacked together. The plates 10a each have a pair of spiral slots 17a,17a', a central splined opening 14a, inner openings 13a and outer openings 11a, while the end plate 32a has a central unsplined opening 46a with a pair of enlarged arcuate recesses (see FIG. 3) to receive the heads 48a of rivets 34a and a plurality of outer openings 45a. The spring disc 166 has a single spiral slot 167, similar to that shown in FIG. 7, extending from one of a plurality of openings 168 in the outer periphery to merge into and terminate in an inner opening 169 adjacent a central unsplined opening 172, the slot forming a single spring arm 171. Located adjacent the central opening are a pair of arcuate enlarged slots 173,173 received the heads 174 at the opposite ends of the rivets 34a; one of the arcuate slots intersecting the spiral slot 167. All of the plates 10a, end plate 32a and spring disc 166 are secured together in a stack by suitable securing means, such as bolts 175, extending through several of the aligned circumferentially spaced openings 11a, 45a and 168 of the discs 10a, 32a and 166, respectively. The splined end 177 of a shaft 176 extends into the splined openings 14a to rotate with the discs 10a.

Assuming that the stack of discs are bolted to a flywheel, such as the flywheel 38 shown in FIG. 1, by the bolts 175, torque applied by rotation of the flywheel is transmitted through the outer rings 24a, spring arms 18a, and inner rings 25a to the shaft 176. As the spring arms wind up, the rivets 34a will move relative to the spring disc 166 within the arcuate slots 173; the spring disc 166 rotating with the discs 10a relative to the shaft. When the rivets engage the ends of slots 173, then the applied torque will cause the spring arm 171 to wind up resulting in added spring resistance to the torque. The assembly will act in a similar fashion if the outer ring is held stationary and torque is applied through the shaft 176.

The present invention in its various embodiments has several advantages, especially for the embodiments shown in FIGS. 1 through 6, 13 and 14:

1. Torque applied to the spiral spring discs produces almost pure bending long springs.
2. The blind groove ends provide the end fixities for the spring beams between the inner and outer rings of the discs.
3. Stress is substantially uniform in long springs having a constant width. Involute profiled grooves or slots with a constant width produce involute profiled spring arms having a constant width.
4. Spring arm width can be gradually increased toward the ends, modifying the groove profiles to compensate for stress concentrations.
5. The spiral grooves can be designed for a required travel (angular displacement) at an allowable stress level without buckling of the spring disc.
6. Discs can be packed in parallel, attaching their inner rings or hubs and ribs together, to carry the requisite torque.
7. Discs can be connected together in series to provide multi-level stiffness. Multi-level stiffness can also be achieved using groove contacts in parallel connections.
8. Discs may be laterally formed to fit within a certain envelope (see FIG. 11).

I claim:

1. A spring disc resilient coupling adapted for use in a torsional coupling or clutch assembly between driving and driven members, comprising a plurality of spring discs secured together to operate as a unit, each disc including an outer peripheral ring having a plurality of circumferentially spaced openings therein, an inner peripheral ring having a plurality of circumferentially spaced openings therein and at least one smooth continuously curved slot extending through said disc between said outer ring and said inner ring to define a curved resilient member joining the inner and outer rings and resisting relative rotation therebetween, each said curved slot intersecting an outer opening and an inner opening, said outer rings being secured to one of said driving or driven members and said inner rings being operatively connected to the other of said driving or driven member.

2. A spring disc coupling as set forth in claim 1, wherein securing means extends through some of said inner and outer openings.

3. A spring disc coupling as set forth in claim 2, wherein said curved slot has a width less than the diameter of said outer opening and inner opening.

4. A spring disc coupling as set forth in claim 1, wherein at least one disc has a diameter greater than the remaining discs to provide a mounting flange for the stack.

5. A spring disc coupling as set forth in claim 1, wherein said central openings of said discs have axially aligned splines therein adapted to receive a splined end of a rotatable shaft.

6. A spring disc coupling as set forth in claim 1, in which each said slot is in the form of a spiral to provide a generally spiral spring member of substantially constant width throughout its length.

7. A spring disc coupling as set forth in claim 6, wherein each said slot intersects an outer opening and an inner opening generally tangentially thereto for the disc.

8. A spring disc coupling as set forth in claim 7, wherein said spring member gradually increases in width adjacent the ends of the slot.

9. A spring disc coupling as set forth in claim 1, wherein the inner ring and outer ring of each disc are axially offset.

10. A spring disc coupling as set forth in claim 1, wherein a friction facing carrier plate extends beyond the peripheries of said discs for annular friction facings secured thereto.

11. A spring disc coupling as set forth in claim 10, in which said carrier plate has outer openings aligned with the openings in the outer rings of the discs and inner openings aligned with the inner openings of said inner disc rings.

12. A spring disc coupling as set forth in claim 1, wherein each disc includes two spiral slots intersecting oppositely disposed inner and outer openings.

13. A spring disc coupling as set forth in claim 1, in which each disc has three spiral slots formed therein, the slots originating at circumferentially equally spaced intervals around the disc.

14. A spring disc coupling as set forth in claim 1, in which each disc has a plurality of spiral slots formed therein, said slots originating at circumferentially equally spaced intervals around the disc.

15. A spring disc resilient coupling adapted for use in a torsional coupling or clutch assembly between driving and driven members, comprising a plurality of spring discs secured together in a stack to operate as a unit, each disc including an outer peripheral ring, an inner peripheral ring and a pair of smooth continuously curved spiral slots extending through said disc between said inner ring and said outer ring to define a pair of curved resilient members joining the inner and outer rings and resisting relative rotation therebetween, said outer ring having a plurality of circumferentially spaced openings therein, said inner ring having a plurality of circumferentially spaced openings therein, securing means through said inner and outer openings, said pair of slots intersecting oppositely disposed balance the forces, said outer rings being secured to one of said driving or driven members and said inner rings being operatively connected to the other of said driving or driven members.

16. A spring disc coupling as set forth in claim 15, wherein the inner openings receiving the rivets are located between the inner openings intersecting the slots.

17. A spring disc resilient coupling adapted for use in a torsional coupling or clutch assembly between driving and driven members, comprising a plurality of spring discs secured together in a stack to operate as a unit, each disc including an outer peripheral ring, an inner peripheral ring and a smooth continuously curved slot extending through said disc between said outer ring and said inner ring to define a curved resilient member joining the inner and outer rings and resisting relative rotation therebetween, the successive discs in the stack being rotated through an arc of rotation divisible into 360° from the previous disc to phase the discs in the assembly and inner and outer openings, and end plates secured to said stack of discs, each end plate having a central opening with a pair of oppositely disposed arcuate peripheral recesses cooperating with a pair of rivets in a pair of oppositely disposed inner openings to limit relative rotation between said inner and outer rings, said outer rings being secured to one of said driving or driven members and said inner rings being operatively connected to the other of said driving or driven members.

18. A spring disc coupling as set forth in claim 17, in which successive discs in the stack are rotated through angles of 60° from the preceeding disc.

19. A spring disc resilient coupling adapted for use in a torsional coupling or clutch assembly between driving and driven members, comprising a plurality of spring discs secured together in a stack to operate as a unit, each disc including an outer peripheral ring, an inner peripheral ring and at least one smooth continuously curved slot extending through said disc between said outer ring and said inner ring to define a curved resilient member joining the inner and outer rings and resisting relative rotation therebetween, alternate discs in the stack being reversed so that the curved spring members rotate in opposite directions, said outer ring being secured to one of said driving or driven members and said inner rings being operatively connected to the other of said driving or driven members.

20. A spring disc resilient coupling adapted for use in a torsional coupling or clutch assembly between driving and driven members, comprising a plurality of spring discs secured together in a stack to operate as a unit, each disc including an outer peripheral ring, an inner peripheral ring and at least one smooth continuously curved slot extending through said disc between said outer ring and said inner ring to define a curved resilient member joining the inner and outer rings and resisting relative rotation therebetween, said spring disc stack consisting of at least two types of spring discs arranged to wind up at different time intervals to produce a multi-stage resilient coupling, said outer rings being secured to one of said driving or driven members and said inner rings being operatively connected to the other of said driving or driven members.

21. A spring disc coupling as set forth in claim 20, wherein a stack of several first spring discs having two spiral slots forming pairs of spring arms are combined with an end plate at one end and a single spiral slot second spring disc at the opposite end, all discs and end plate being secured at their outer peripheries, the first spring discs having splined central openings receiving a splined shaft and being riveted together adjacent the central openings, the second spring disc having a central opening larger than the splined shaft.

22. A spring disc coupling as set forth in claim 21, wherein said rivets have enlarged heads, and said second spring disc has a pair of generally diametrically opposed arcuate slots receiving said rivet heads for limited movement therein.

23. A spring disc coupling as set forth in claim 22, wherein torque applied to the outer rings of the first and second spring discs causes the first spring discs to wind up and, when the rivet heads abut the ends of the arcuate slots, the second spring disc is picked up to add to the resilient action of the first spring discs.

* * * * *

UNITED STATES PATENT AND TRADEMARK OFFICE
CERTIFICATE OF CORRECTION

PATENT NO. : 4,795,012
DATED : January 3, 1989
INVENTOR(S) : METIN MUSTAFA DURUM It is certified that error appears in the above-identified patent and that said Letters Patent is hereby corrected as shown below:

Column 9, line 4, after "disposed" cancel "balance The"

line 4, after "disposed" insert -- inner and outer openings, and end plates secured to said stack of discs, each end plate having a central opening with a pair of oppositely disposed arcuate peripheral recesses cooperating with a pair of rivets in a pair of oppositely disposed inner openings to limit relative rotation between said inner and outer rings, --.

line 5, cancel "forces"

Column 9, lines 25, cancel "inner and outer openings and end plates";
line 26, cancel the entire line.
line 27, cancel the entire line.
line 28, cancel the entire line
line 29, cancel the entire line,
line 30, cancel "relative rotation between said inner and outer rings,"

UNITED STATES PATENT AND TRADEMARK OFFICE
CERTIFICATE OF CORRECTION

PATENT NO. : 4,795,012

DATED : January 3, 1989

INVENTOR(S) : Metin Mustafa Durum

It is certified that error appears in the above-identified patent and that said Letters Patent is hereby corrected as shown below:

line 30, before "said" insert -- and balance the forces, --.

Signed and Sealed this

Twentieth Day of June, 1989

Attest:

DONALD J. QUIGG

Attesting Officer

Commissioner of Patents and Trademarks